US012728407B2

(12) United States Patent
Takeda et al.

(10) Patent No.: US 12,728,407 B2
(45) Date of Patent: Sep. 8, 2026

(54) METHANE COMBUSTION CATALYST AND METHOD FOR PRODUCING SAME, AND METHOD FOR PURIFYING COMBUSTION EXHAUST GAS

(71) Applicant: TANAKA KIKINZOKU KOGYO K.K., Tokyo (JP)

(72) Inventors: Kazutaka Takeda, Ibaraki (JP); Shunsuke Kato, Ibaraki (JP); Shunji Kikuhara, Ibaraki (JP)

(73) Assignee: TANAKA PRECIOUS METAL TECHNOLOGIES Co., Ltd., Tokyo (JP)

( * ) Notice: Subject to any disclaimer, the term of this patent is extended or adjusted under 35 U.S.C. 154(b) by 410 days.

(21) Appl. No.: 18/271,220

(22) PCT Filed: Oct. 5, 2021

(86) PCT No.: PCT/JP2021/036787
§ 371 (c)(1),
(2) Date: Jul. 6, 2023

(87) PCT Pub. No.: WO2022/149319
PCT Pub. Date: Jul. 14, 2022

(65) Prior Publication Data
US 2024/0058790 A1 Feb. 22, 2024

(30) Foreign Application Priority Data
Jan. 7, 2021 (JP) ................................ 2021-001710

(51) Int. Cl.
*B01J 23/62* (2006.01)
*B01D 53/94* (2006.01)

(52) U.S. Cl.
CPC ............ *B01J 23/626* (2013.01); *B01D 53/94* (2013.01); *B01D 2257/7025* (2013.01); *B01D 2258/01* (2013.01)

(58) Field of Classification Search
CPC ....... B01J 23/626; B01J 23/468; B01D 53/94; B01D 2257/7025; B01D 2258/01
See application file for complete search history.

(56) References Cited

FOREIGN PATENT DOCUMENTS

EP 3673992 A1 * 7/2020 ............. F01N 3/103
JP 2006-272079 A 10/2006
(Continued)

OTHER PUBLICATIONS

JP 2006272079 A machine translation (Year: 2006).*
(Continued)

*Primary Examiner* — Sally A Merkling
*Assistant Examiner* — Nicole Lee Quist
(74) *Attorney, Agent, or Firm* — Foley & Lardner LLP

(57) ABSTRACT

The present invention relates to a methane combustion catalyst including platinum and iridium supported on a tin oxide carrier for combusting methane in a combustion exhaust gas containing sulfur oxide. In this methane combustion catalyst, in line analysis by electron probe micro-analysis performed on an arbitrary cross-section thereof from a deepest catalyst portion toward a catalyst surface, a first region where all of platinum, iridium and tin are detected and a second region where tin is essentially detected but platinum is not detected are both observable. In a specific form, the catalyst includes a base catalyst layer where platinum and iridium are supported on a tin oxide carrier, and an overcoat layer including tin oxide formed on the base catalyst layer. The methane combustion catalyst of the present invention is excellent in initial activity, and is improved in durability.

17 Claims, 8 Drawing Sheets

(56) References Cited

FOREIGN PATENT DOCUMENTS

| | | | |
|---|---|---|---|
| JP | 4429950 | B2 | 10/2006 |
| JP | 2008-246473 | A | 10/2008 |
| JP | 4283037 | B2 | 3/2009 |
| WO | WO-2019/039513 | A1 | 2/2019 |

OTHER PUBLICATIONS

Yu et al "High-Temperature-Stable Au@SnO2 Core/Shell Supported Catalyst for CO Oxidation", Journal of Physical Chemistry C, 112 7, 2008, 2244-2247 (Year: 2008).*

International Searching Authority, "International Search Report and Written Opinion," issued in connection with International Patent Application No. PCT/JP2021/036787, dated Dec. 21, 2021.

Chang et al., "Effect of Ultra-Thin SnO2 Coating on Pt Catalyst for Energy Applications", International Journal of Precision Engineering and Manufacturing, vol. 17, No. 5, May 12, 2016, pp. 691-694.

European Extended Search Report issued in corresponding European Patent Application No. 21917544.5 dated May 7, 2024 (6 pages).

* cited by examiner

METHANE COMBUSTION CATALYST AND METHOD FOR PRODUCING SAME, AND METHOD FOR PURIFYING COMBUSTION EXHAUST GAS

CROSS-REFERENCE TO RELATED APPLICATIONS

The present application claims priority under 35 U.S.C. § 371 to International Patent Application No. PCT/JP2021/036787, filed Oct. 5, 2021, which claims priority to and the benefit of Japanese Patent Application No. 2021-001710, filed on Jan. 7, 2021. The contents of these applications are hereby incorporated by reference in their entireties.

BACKGROUND OF THE INVENTION

Field of the Invention

The present invention relates to a catalyst for oxidatively removing methane from a combustion exhaust gas containing sulfur oxide. Specifically, it relates to a catalyst having catalyst poisoning with sulfur oxide suppressed, and capable of oxidizing methane with higher activity as compared with a conventional product. The present invention also relates to a purification method comprising oxidatively removing methane from a combustion exhaust gas with the catalyst.

Description of the Related Art

Exhaust gases generated from engines, boilers and the like using hydrocarbons, such as natural gas, city gas, light oil, and kerosene, as fuel contain not only nitrogen oxide (NOx), sulfur oxide ($SO_2$, SOx), carbon monoxide (CO), odorant/soot and dust, and the like but also unburnt hydrocarbons. All of these can be a cause of environmental pollution, and the exhaust gasses are then discharged after being treated with a filter or a purification catalyst. In particular, methane has been reported to cause the greenhouse effect 20 times or more as much as carbon dioxide, and hence is very highly necessary to be removed from the viewpoint of environmental protection.

As a purification catalyst for hydrocarbons, a precious metal catalyst containing a catalyst particle of a precious metal such as platinum supported on a carrier of alumina, zirconia or the like has been used for a long period of time. It is known, however, that such a precious metal catalyst is not very effective for oxidative removal of methane. In particular, when sulfur oxide is contained in an exhaust gas, there arises a problem that activity is conspicuously decreased by catalyst poisoning.

Under this background, as a methane combustion catalyst for oxidatively removing methane from a combustion exhaust gas containing sulfur oxide, catalysts described in Patent Document 1 and Patent Document 2 are known (hereinafter, a methane combustion catalyst may be simply referred to as a "catalyst"). These catalysts contain a catalyst particle of platinum supported on a tin oxide (SnO2) carrier. In particular, in the catalyst of Patent Document 2, iridium is further supported to improve durability.

PRIOR ART DOCUMENT

Patent Document

Patent Document 1: Japanese Patent No. 4283037
Patent Document 2: Japanese Patent No. 4429950

SUMMARY OF THE INVENTION

Technical Problem

It is confirmed that the catalysts of Patent Documents 1 and 2 (hereinafter they may be referred to as the Pt/$SnO_2$-based catalyst and the Pt—Ir/$SnO_2$-based catalyst; respectively, both of which may be generically referred to as the Pt/$SnO_2$-based catalyst) definitely have an effect of oxidatively removing methane from a combustion exhaust gas containing sulfur oxide. In particular, when the sulfur oxide concentration in the exhaust gas is 1 ppm or more, the Pt/$SnO_2$-based catalyst has an interesting characteristic of presenting improved activity. The Pt/$SnO_2$-based catalyst is also a significant catalyst in that activity effective against methane is exhibited by supporting platinum, whose effectiveness has not been recognized, on a tin oxide carrier. In addition, it has been confirmed that the Pt—Ir/$SnO_2$-based catalyst in which iridium is additionally supported on a Pt/$SnO_2$-based catalyst has improved durability.

As described above, a conventional Pt/$SnO_2$-based catalyst can combustively remove methane from a combustion exhaust gas containing sulfur oxide, and is evaluated in durability to some extent. In accordance with enlargement of the application range of gas engines and the like, a methane combustion catalyst is required to have higher durability for coping with elongation of the operating time.

Here, according to examinations made by the present inventors, although a Pt/$SnO_2$-based catalyst needs sulfur oxide contained in an exhaust gas for methane combustion, this does not mean that sulfur oxide does not harmfully affect the catalytic activity. A conventional Pt/$SnO_2$-based catalyst is continuously decreased in activity in accordance with increase of the operating time. The mechanism of this activity decrease will be described later, and the present inventors presume that the factor is catalyst poisoning with sulfur oxide. Accordingly, in order to further improve durability of a Pt/$SnO_2$-based catalyst, it is necessary to reduce influence of catalyst poisoning with sulfur oxide.

In addition, in the field of catalysts in general, those capable of exhibiting higher activity are always required. Also as for methane combustion catalysts, those exhibiting higher activity than conventional ones are similarly required. Activity improvement at an initial stage enables, together with durability improvement, long-term operation.

The present invention was devised under such background, and an object is to provide a methane combustion catalyst that is based on the above-described Pt/$SnO_2$-based catalyst, has excellent activity, and also excellent durability, and a method for producing the same.

Solution to Problem

Even if a conventional Pt/$SnO_2$-based catalyst needs sulfur oxide for methane combustion, this does not mean that sulfur oxide does not harmfully affect the catalytic activity. Activity mechanism for methane combustion activity of the Pt/$SnO_2$-based catalyst was examined to discuss a state of platinum used as a catalyst particle in particular. As a result, it was concluded that Pt is likely to be present in the form of platinum oxides (PtO or $PtO_2$) in the Pt/$SnO_2$-based catalyst, and that the activity for methane combustion is exhibited only when a high ratio of Pt in the form of platinum oxides is present in the entire supported Pt. The Pt/$SnO_2$-based catalyst is produced by burning with a platinum complex supported on a tin oxide carrier, which will be described in detail later. During this process, platinum is presumed to be in an oxidized state owing to both oxidation effect caused by burning and interaction with the tin oxide carrier that is an oxide.

It was discussed, as a mechanism of catalyst poisoning of the Pt/$SnO_2$-based catalyst caused by sulfur oxide, that the sulfur oxide deforms the catalyst particle (platinum oxides). The present inventors thus presumed because the Pt/$SnO_2$-based catalyst does not show a general degradation tendency through adsorption of a poisoning substance. If sulfur oxide is a general poisoning substance to decrease the activity because the adsorption thereof inhibits adsorption between a combustion component (methane) and the catalyst particle, the activity stops decreasing when the adsorbed amount of the poisoning substance reaches equilibrium. According to test and examination performed by the present inventors, however, the Pt/$SnO_2$-based catalyst does not show such a tendency but the activity continuously decreases even when the adsorbed amount of sulfur oxide reaches equilibrium at an initial stage of the reaction. This reveals that the catalyst particle (platinum oxides) is deformed by sulfur oxide.

The present inventors have discussed a specific mechanism of the activity decrease of the Pt/$SnO_2$-based catalyst caused by sulfur oxide as follows. Sulfur oxide such as $SO_2$ reaching the vicinity of a catalyst particle (platinum oxides) is easily oxidizable, and hence is oxidized to $SO_3$ or the like by depriving oxygen from the platinum oxides and desorb. The platinum particle that is deprived of oxygen and metalated sinters together with a platinum particle similarly metalated nearby to form a coarse platinum particle. The platinum particle thus metalated and coarsened is poor in methane combustion activity. In addition, the metalation of platinum oxides and the sintering of a platinum particle continue even after the adsorbed amount of sulfur oxide reaches equilibrium, and then the activity continuously decreases.

The present inventors discussed the activity mechanism and the mechanism of the activity decrease by sulfur oxide of the Pt/$SnO_2$-based catalyst as described above. Based on this discussion, a Pt—Ir/$SnO_2$-based catalyst obtained by additionally supporting iridium on a Pt/$SnO_2$-based catalyst can be also explained reasonably to have a good durability, as revealed in Patent Document 2. In the Pt—Ir/$SnO_2$-based catalyst, iridium is present in the form of oxide ($IrO_2$) similarly to platinum, but it is presumed that iridium and iridium oxide minimally have activity for methane combustion. It is, however, regarded that iridium oxide has a function to retain the oxidized state of platinum by supplying oxygen to platinum metalated under the influence of sulfur oxide. In addition, iridium oxide is metalated by reduction caused through the oxygen supply to platinum, or reduction caused by sulfur oxide, but this reduced iridium can retain an oxidized iridium state by receiving oxygen supply from the tin oxide carrier. It is presumed owing to such effect of iridium oxide that the durability of the methane combustion catalyst is improved.

It is deemed, based on these discussions, that durability improvement of a Pt/$SnO_2$-based catalyst depends on how the oxidized state of platinum obtained immediately after production (at an initial stage of reaction) is retained. The present inventors made studies from this point of view, and as a result, conceived of utilizing the effect of tin oxide used as a carrier more effectively than in conventional techniques.

The effect of tin oxide refers to oxygen supply capacity for precious metals. As described above, tin oxide contributes to generation of platinum oxides in burning performed in producing a catalyst, and hence is presumed to have oxygen supply capacity for precious metals. The effective utilization of the oxygen supply capacity for precious metals here refers to causing the ability of tin oxide to supply oxygen to iridium (iridium oxide) contained in a Pt—Ir/$SnO_2$-based catalyst to be exhibited more effectively than in conventional techniques.

As described above, iridium oxide contained in a Pt—Ir/$SnO_2$-based catalyst has a function to retain an oxide state of platinum by supplying oxygen to metalated platinum. Owing to this function, iridium is metalated, but can return to original iridium oxide through oxygen supply from tin oxide. When such a reduction-oxidation cycle of iridium oxide is effectively caused, the oxidized state of platinum can be retained, and it is presumed that activity decrease of the catalyst due to sulfur oxide can be possibly inhibited.

Based on this discussion, the present inventors examined a method for causing oxygen supply from tin oxide to iridium oxide of a Pt—Ir/$SnO_2$-based catalyst more effectively than in conventional techniques. As a result, it was found that the above-described problem can be solved by forming, on a surface of a Pt—Ir/$SnO_2$-based catalyst, a region not containing platinum but containing tin oxide as a principal component, and thus, the present invention was accomplished.

The present invention that solves the above-described problem is drawn to a methane combustion catalyst including platinum and iridium supported on a tin oxide carrier for combusting methane in a combustion exhaust gas containing sulfur oxide, in which in line analysis by electron probe microanalysis (EPMA) performed on an arbitrary cross-section of the methane combustion catalyst from a deepest catalyst portion toward a catalyst surface, a first region where all of platinum iridium and tin are detected and a second region where tin is essentially detected but platinum is not detected are both observable.

Advantageous Effects of Invention

As described so far, the present invention relates to a Pt/$SnO_2$-based catalyst (Pt—Ir/$SnO_2$-based catalyst) that is a methane combustion catalyst, having, on a surface thereof, a region not containing platinum but principally containing tin oxide. According to the present invention, not only initial activity of the methane combustion catalyst is increased but also durability thereof is improved, and hence, a combustion exhaust gas can be treated for a long period of time as compared with conventional techniques.

Figure 1:
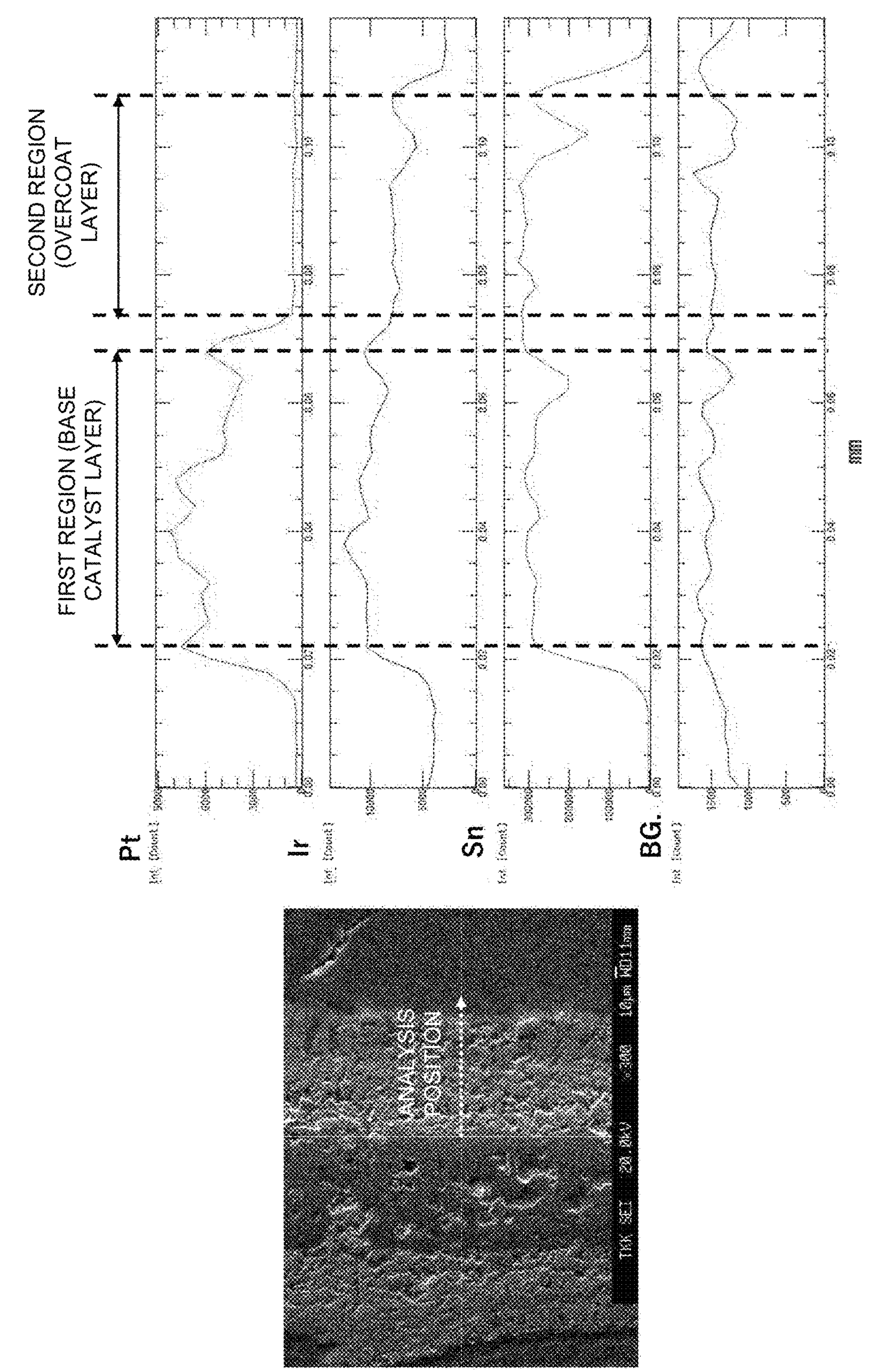
FIG. 1 is a diagram illustrating results of EPMA line analysis performed on a methane combustion catalyst cross-section of Example 1 of First Embodiment.

DETAILED DESCRIPTION OF THE PREFERRED EMBODIMENTS (A) Basic Form of Methane Combustion Catalyst of the Present Invention An embodiment of a methane combustion catalyst of the present invention will now be described in detail. The methane combustion catalyst of the present invention is characterized by including a second region where Pt is not observed in an element distribution obtained by EPMA of a catalyst cross-section, and contains, as constituent elements of the entire catalyst, a tin oxide carrier, Pt (Pt oxides) and Ir (Ir oxides) similarly to the conventional Pt—Ir/$SnO_2$-based catalyst (Patent Documents 1 and 2). In the following description of the present invention, the details of the respective elements will be described as a basic form of the methane combustion catalyst of the present invention, and thereafter, the element distributions in a first region and a second region characterizing the present invention will be described.

(A-1) Tin Oxide Carrier

A "tin oxide carrier" refers to an inorganic oxide carrier containing tin oxide ($SnO_2$) as a principal component (preferably 80% by mass or more, and more preferably 95% by mass or more). As the tin oxide carrier, not only a carrier including tin oxide but also an inorganic oxide carrier obtained by doping tin oxide with a metal excluding precious metals (platinum, iridium and the like) or a compound thereof without affecting catalyst properties is applied. The tin oxide carrier is an essential constitution because of the original function of a carrier to hold respective catalyst particles in a dispersed state as well as impartment of activity for methane combustion to platinum (platinum oxides) of catalyst particles. Furthermore, as described above, the tin oxide carrier is deemed to have an effect of supplying oxygen to precious metals, and hence has an effect of supplying oxygen to metalated iridium for returning it to original iridium oxide. Therefore, the tin oxide carrier can be an essential constitution in retaining durability of a catalyst with iridium oxide. In addition, tin oxide is a principal component of the second region of the methane combustion catalyst of the present invention.

As a form of the tin oxide carrier, one according with the form of the methane combustion catalyst is employed. Here, the form of the methane combustion catalyst can be any one of shapes of a grain, a granule, a pellet, and a tablet. In such a methane combustion catalyst, the tin oxide carrier is also similarly in the shape of a grain, a granule, a pellet, or a tablet. Such a tin oxide carrier has a specific surface area of preferably 10 $m^2/g$ or more and 27 $m^2/g$ or less, and more preferably 11 $m^2/g$ or more and 15 $m^2/g$ or less.

As the form of the methane combustion catalyst, there are also many examples of application in which the methane combustion catalyst is supported on an appropriate support. As the support, supports in any one of the shapes of a plate, a cylinder, a sphere and a honeycomb are known. In a catalyst in such a form, tin oxide is applied/fixed on a support as what is called a wash coat, and thus, a tin oxide carrier can be formed. The specific surface area of the tin oxide carrier in such a form is also preferably the same as the specific surface area of the carrier in the shape of a pellet or the like described above.

The tin oxide carrier is an element occupying a large part of the methane combustion catalyst on a mass basis, and hence an amount of tin oxide used determines supported amounts (support rates) of platinum and iridium. There is, however, no need to specifically limit the amount of tin oxide used.

(A-2) Platinum (Platinum Oxides)

In a Pt—Ir/$SnO_2$-based catalyst, platinum is a main catalytic metal exhibiting methane combustion activity. Platinum exhibits the methane combustion activity in an oxide state. The supported amount of platinum in the methane combustion catalyst of the present invention is preferably 0.5% by mass or more and 15% by mass or less in terms of metal platinum on a mass basis with respect to the total mass of the catalyst. A lower limit of the supported amount of platinum is more preferably 2.0% by weight, and further preferably 4.0% by weight. An upper limit of the supported amount of platinum is more preferably 10.5% by weight. Platinum (platinum oxides) in such a supported amount is present in the first region alone. It is noted that the term "total mass of the catalyst" herein refers to a totalized mass of the tin oxide carrier, platinum, iridium, and an overcoat layer described below. Accordingly, in a catalyst in which tin oxide is coated/fixed on a support as a wash coat as described above, the mass of the support is not included in the total mass of the catalyst.

(A-3) Iridium (Iridium Oxide)

In the methane combustion catalyst of the present invention, iridium works as a promoter for improving durability. As the mechanism, as described above, iridium oxide reacts with sulfur oxide prior to platinum oxides, and thus, metalation of platinum oxides is inhibited. According to examinations made by the present inventors, it is confirmed that most of supported iridium is in an oxidized state in a catalyst immediately after production.

A supported amount of iridium in the methane combustion catalyst of the present invention is preferably 0.1% by mass or more and 5.0% by mass or less in terms of metal iridium with respect to the total mass of the catalyst. A lower limit of the supported amount of iridium is more preferably 0.2% by mass. An upper limit of the supported amount of iridium is more preferably 2.5% by mass. Iridium is essentially contained in the first region, and optionally contained in the second region (that is, the overcoat layer described below). The supported amount of iridium is expressed as a proportion in the entire catalyst, and hence, even when iridium is contained also in the second region, the supported amount is preferably within the above-described range in the entire catalyst.

(A-4) Element Distribution on Catalyst Cross-Section (First Region and Second Region)

In the present invention, the structure of the catalyst is divided into the first region and the second region on the basis of results of composition analysis obtained by EPMA line analysis on an arbitrary cross-section of the methane combustion catalyst including a Pt—Ir/$SnO_2$-based catalyst. In the present invention, the EPMA line analysis is employed because the element distribution in a catalyst cross-section can be comparatively simply and accurately grasped by EPMA, and thus the structure of the methane combustion catalyst of the present invention can be easily checked. Intensity of X-ray (characteristic X-ray) detected in EPMA analysis is reflected in the composition (existence ratio) of a substance to be analyzed. Therefore, EPMA analysis is a proper analysis method for distinguishing the first region and the second region from each other based on presence of Pt.

The first region of the methane combustion catalyst of the present invention is a region where all the elements of platinum, iridium, and tin (tin oxide) of the constituent elements of the catalyst are detected by line analysis performed from a deepest catalyst portion toward a catalyst surface. The first region has the same constitution as a usual Pt—Ir/$SnO_2$-based catalyst, and is a region having methane combustion activity.

In the line analysis performed from the first region toward the catalyst surface, the X-ray intensity of platinum is abruptly reduced, and a region where platinum is not detected but tin is continuously detected is found. This region corresponds to the second region of the present invention. The region not containing platinum but containing tin oxide as a principal component is thus formed for effectively generating the oxygen supply capacity of tin oxide. The second region does not contain platinum, and hence is poor in methane combustion activity, but works as a region for improving durability for retaining platinum oxides by supplying oxygen to iridium (iridium oxide). It is noted that the term "platinum is not detected" used herein is not limited to a state where the intensity (count number) of X-ray of platinum obtained by EPMA analysis is zero. In consideration of influence of background and the like in the analysis, the term includes a state where platinum is not substantially detected.

The methane combustion catalyst of the present invention is divided into the first region and the second region as described above by EPMA line analysis. The second region can be clearly observed in the form of a layer shape (overcoat layer) as described later, but the second region in a film/layer shape needs not always cover the catalyst surface. A region having a high tin oxide concentration may be present in the shape of dots.

Based on the above-described characteristics of EPMA analysis, the first region and the second region can be determined in the methane combustion catalyst of the present invention by performing the EPMA analysis on an arbitrary cross-section. Since the second region does not contain platinum, the characteristic X-ray intensity of Sn is higher in the second region than in the first region. Specifically, assuming that the X-ray intensity of tin in the first region is $X_1$ and that the X-ray intensity of tin in the second region is $X_2$, there is a relationship of $X_1<X_2$. Based on results of examination made by the present inventors, a ratio of $X_1$ and $X_2$, $X_2/X_1$, is 1.08 or more and 1.25 or less in the methane combustion catalyst of the present invention.

(B) Specific Form of Methane Combustion Catalyst of the Present Invention

In a specific and representative form of the methane combustion catalyst of the present invention, the second region is layered tin oxide, which covers the Pt—Ir/$SnO_2$-based catalyst. At this time, the Pt—Ir/$SnO_2$-based catalyst containing platinum and iridium supported on the tin oxide carrier corresponding to the first region can be designated as a base catalyst layer. The second region including tin oxide disposed on the base catalyst layer can be designated as the overcoat layer.

The structure of the base catalyst layer is the same as that of the basic form of the methane combustion catalyst including the Pt—Ir/$SnO_2$-based catalyst described above, and catalytic metals of both platinum and iridium are supported on tin oxide. In addition, the supported amounts of platinum and iridium in the base catalyst layer are the same as those in the basic form described above.

On the other hand, the overcoat layer is such a layer as that does not contain platinum (platinum oxides) corresponding to activity source, but contains tin oxide as a principal component. The overcoat layer can be deemed as a region where tin oxide is thickened as compared with the composition of the base catalyst layer. The overcoat layer where tin oxide is thickened has an effect of increasing the effect of supplying oxygen to iridium present in the base catalyst layer. The overcoat layer itself does not contain platinum, and hence is poor in methane combustion activity.

An amount of tin oxide contained in the overcoat layer of the methane combustion catalyst according to this specific form is preferably 10.0% by mass or more and 45.0% by mass or less on a mass basis in the entire catalyst. When the amount is less than 10.0% by mass, the resultant is poor in the above-described effects of catalyst activity increase and durability improvement. When the amount is beyond 45.0% by mass, the overcoat layer is too thick, and hinders gas diffusion to the base catalyst layer, and hence the catalyst activity may be decreased. The amount of tin oxide contained in the overcoat layer is more preferably 20% by mass or more and 35% by mass or less on a mass basis in the entire catalyst.

The overcoat layer can be constituted by tin oxide alone, but can optionally contain iridium. It has been confirmed that initial activity and durability of a catalyst are improved by adding iridium to the overcoat layer. The mechanism of this effect has not been cleared yet, and the present inventors presume that the effect is obtained because iridium contained in the overcoat layer is present also as iridium oxide. Iridium oxide contained in the overcoat layer also has an oxygen supply capacity for platinum oxides contained in the base catalyst layer, which probably causes the oxidized state of platinum to be further retained.

When iridium is added to the overcoat layer, this iridium is added separately from iridium contained in the base catalyst layer (first region). The amount is preferably 0.05% by mass or more and 6.5% by mass or less with respect to the mass of the overcoat layer. When the amount of iridium added is too small, the above-described effect cannot be exhibited, which is equivalent to a case where it is not added. When the amount of iridium added is too large, a distance between iridium particles may be too small, or iridium particles may be coarsened. These leads to deteriorate dispersibility of the iridium particles, and therefore, it is difficult to efficiently exhibit the effect of the iridium particles. An iridium content in the overcoat layer is more preferably 0.05% by mass or more and 2.5% by mass or less.

(C) Oxidized State of Platinum in Methane Combustion Catalyst of the Present Invention As described above, the methane combustion activity of a Pt/$SnO_2$-based catalyst is exhibited not by metalated platinum but by platinum oxides. Therefore, in order to further increase the methane combustion activity of the Pt/$SnO_2$-based catalyst, it is preferable to increase, as compared with in conventional techniques, the amount of platinum in an oxide state working as activity source. In this regard, a given amount of platinum oxides is naturally present also in a conventional Pt/$SnO_2$-based catalyst, and the activity (initial activity) thereof is also at evaluable level. The presence of the second region of the present invention mainly containing tin oxide and disposed on the catalyst surface is useful for a conventional Pt/$SnO_2$-based catalyst, and a proper methane combustion catalyst can be obtained owing to the effect thereof alone. It is deemed, however, that the increase of initial activity of the $Pt/SnO_2$-based catalyst (or the base catalyst layer if the overcoat layer is formed) corresponding to the foundation of the present invention provides a more useful catalyst. The increase of methane combustion activity at an initial stage can also contribute to a longer effective period of the catalyst. Therefore, it is preferable to increase the amount of platinum in an oxide state for these purposes.

Specifically, a ratio $R_{TO}$ of platinum oxides to metal platinum is preferably 10.0 or more, the ratio $R_{TO}$ being based on state percentages of metal platinum (Pt) and platinum oxides (PtO and $PtO_2$) obtained from a platinum 4f spectrum through measurement of the methane combustion catalyst of the present invention by X-ray photoelectron spectroscopy (XPS) and calculated in accordance with the following expression.

$$R_{TO} = (R_{PtO} + R_{PtO2}) / R_{Pt} \qquad \text{[Expression 1]}$$

wherein $R_{Pt}$ is a state percentage of metal platinum (Pt), $R_{PtO}$ is a state percentage of PtO, and $R_{PtO2}$ is a state percentage of $PtO_2$.

In the present invention, it is preferable to specify the oxidized state of platinum in the catalyst based on analysis results obtained by X-ray photoelectron spectroscopy (XPS). XPS is a method capable of analyzing types of bonding states and ratios (existence percentages) occupied by the respective bonding states in atoms contained in an analysis target, and hence is applied in the present invention. Specifically, based on a platinum 4f (Pt4f) spectrum observed through analysis of the catalyst by XPS, the oxidized state of platinum is specified from detection intensities at binding energies respectively corresponding to the respective bonding states. Here, in the platinum 4f spectrum, a peak of the metal Pt appears in a range of 71.0 eV to 72.0 eV, a peak of PtO appears in a range of 72.8 eV to 73.2 eV, and a peak of $PtO_2$ appears in a range of 74.6 eV to 75.0 eV. The existence percentages $R_Pt$, $R_{PtO}$, and $R_{PtO2}$ of the respective states of platinum are calculated from peak areas of the respective states.

In the present invention, based on the existence percentages $R_{Pt}$, $R_{PtO}$, and $R_{PtO2}$ of the respective states of platinum, the ratio $R_{TO}$ of platinum oxides to metal platinum obtained according to Expression 1 described above is preferably 10.0 or more. As the ratio $R_{TO}$ of platinum oxides higher, a ratio of platinum atoms in the oxidized state is higher. In a catalyst having the $R_{TO}$ of less than 10.0, the oxidized state of platinum is insufficient, and hence the catalyst is largely affected by sulfur oxide contained in an exhaust gas, and is inferior in the activity for methane combustion. The value of the $R_{TO}$ is more preferably 15.0 or more, and it is deemed that the $R_{TO}$ preferably has a value as high as possible, but it is realistically difficult to oxidize all platinum atoms, and hence the upper limit of the $R_{TO}$ is preferably 40.

In the methane combustion catalyst of the present invention, the oxidized state of iridium is not especially limited. According to examination made on iridium by the present inventors, it has been confirmed that most of supported iridium is oxidized.

(D) Method for Producing Methane Combustion Catalyst of the Invention

Next, a method for producing a catalyst of the present invention will be described. The methane combustion catalyst of the present invention is produced by causing platinum and iridium to be supported on a tin oxide carrier. In this regard, the catalyst is the same as that of the conventional technique, and as the method for producing the catalyst of the present invention, a conventional method can be basically applied. Here, for a conventional methane combustion catalyst, an impregnation method is applied. The impregnation method is a known method for producing a catalyst in which a carrier is impregnated with a solution of a precious metal salt (precious metal compound) to be supported, and the resultant is subjected to a burning heat treatment for precipitating the precious metal on the carrier.

Since the methane combustion catalyst of the present invention has, however, the second region not containing platinum but containing tin oxide as a principal component on the catalyst surface, the impregnation method is applied and a step of forming the second region is additionally performed. Therefore, the method for producing a methane combustion catalyst of the present invention roughly includes a step of producing a catalyst containing platinum and iridium supported on a carrier, and corresponding to a precursor of the methane combustion catalyst of the present invention (which is a catalyst corresponding to the first region, and hereinafter referred to as the pre-catalyst); and a step of forming the second region on the pre-catalyst. The pre-catalyst corresponds to the base catalyst layer when the methane combustion catalyst has an overcoat layer. The method for producing a catalyst of the present invention further includes, if necessary, a step of causing iridium to be supported in the overcoat layer. Now, the respective steps will be described.

(D-1) Step of Producing Pre-Catalyst (First Region, Base Catalyst Layer)

(D-1-1) Optional Step Before Supporting Precious Metals

As a step of providing a tin oxide carrier in accordance with the form of a methane combustion catalyst, preparation of tin oxide in any of various forms, application of a tin oxide slurry on a support and the like can be performed. An example of the preparation of tin oxide includes a heat treatment for adjusting a specific surface area. In this heat treatment, tin oxide in the form of a powder, a grain, a granule, a pellet, or a tablet is preferably burnt in air at a temperature of 450° C. or more and 550° C. or less. When the methane combustion catalyst is supported on a honeycomb support or the like, a tin oxide powder is formed into a slurry to be applied on the support. The tin oxide slurry can be prepared by mixing the tin oxide powder subjected to the heat treatment described above with water used as a dispersion medium, and a binder. For applying the tin oxide slurry on the support, any of various known methods such as air blowing, spraying, dipping and the like can be applied.

When the tin oxide carrier is applied on the support as described above, a proper amount of the tin oxide carrier is 250 g/L or more and 400 g/L or less based on the volume of the support. When the amount of the carrier is as small as less than 250 g/L, a contact area with processing gas is so small that sufficient methane combustion is difficult. On the other hand, when the amount of the carrier is excessive and beyond 400 g/L, a region not in contact with processing gas is formed in the catalyst, and efficiency of methane combustion is lowered also in this case.

(D-1-2) Platinum and Iridium Supporting Step

For supporting platinum and iridium on a tin oxide carrier, an impregnation treatment in a precious metal salt solution of each precious metal is essential. In the present invention, it is preferable that impregnation with a platinum salt solution (supporting of platinum) is priorly performed, and then impregnation with an iridium salt solution (supporting of iridium) is performed. This is because a state where platinum (platinum oxides) and iridium are close to each other can be easily obtained when platinum (platinum oxides) is supported, before supporting iridium, in a fine and dispersed state, and iridium is then supported.

(1) Platinum Supporting Step

The tin oxide carrier having been subjected to the previous step is impregnated with a platinum salt solution if necessary. Examples of the platinum salt solution for impregnating the tin oxide carrier include a platinum nitrate aqueous solution, a platinum chloride aqueous solution, and a platinum acetate aqueous solution as well as platinum complex solutions such as tetraammine platinum salt solution, a dinitrodiammine platinum-ammonia aqueous solution, and a dinitrodiammine platinum-ethanolamine solution. Among these platinum salt solutions, a dinitrodiammine platinum-ammonia aqueous solution, a dinitrodiammine platinum-ethanolamine solution, and platinum nitrate aqueous solution are preferred. A method for impregnating the tin oxide carrier with the platinum salt solution is not especially limited, and any one of spraying, dripping, and dipping may be employed.

In the platinum supporting step of the present invention, the carrier may be impregnated with a platinum salt solution containing a target supported amount of platinum at once, but it is preferable that the tin oxide carrier is impregnated, a plurality of times, with a platinum salt solution having a smaller platinum content until the target carrier amount is reached, and is subjected to a drying/heating treatment after every time of impregnation treatment (hereinafter, which operation is also referred to as divided supporting).

It is for refinement and high dispersion of platinum that the divided supporting is a preferable supporting method. If a platinum salt solution with a platinum concentration corresponding to the target supported amount is impregnated at once, platinum (platinum salt) may be supported unevenly, and thus dispersion may be deteriorated. When a dilute platinum salt solution is impregnated repeatedly, refined platinum can be highly dispersedly supported. This divided supporting makes contribution to fine dispersion of platinum and generation of platinum oxides together with a proper drying treatment described later.

The platinum content in the platinum salt solution to be impregnated in the divided supporting may be different among respective impregnation operations, but a platinum salt solution having a uniform platinum content is preferably impregnated. The number of times of performing the impregnation in the divided supporting depends on the target supported amount, and is preferably approximately 3 to 5 times. Therefore, assuming that the target supported amount is M, the platinum content in a platinum salt solution to be impregnated in one impregnation operation is preferably M/3 to M/5.

It is preferable that the drying treatment is performed after every impregnation operation performed a plurality of times in the divided supporting. The drying treatment is such a treatment in which moisture/crystal water contained in the carrier after the impregnation is evaporated/removed to fix platinum salt on the carrier. The reason that the drying treatment should be regarded as a proper treatment is that if a burning heat treatment is performed in a state where moisture remains, platinum may be moved by the moisture to deteriorate the dispersion. It is preferable, in the drying treatment, that the moisture is removed without decomposing platinum salt having been adsorbed on the carrier. If platinum salt is decomposed at the stage of the drying treatment, it is difficult to obtain platinum oxides through the subsequent burning step. Therefore, it is necessary, in the drying treatment, to perform heating at a temperature where platinum salt is not decomposed with moisture effectively evaporated/removed.

As a preferable drying condition, heating at a temperature of 60° C. or more and 150° C. or less is necessary in the drying treatment. At less than 60° C., evaporation of moisture is so slow that a treatment time is excessive. On the other hand, over 150° C., platinum salt may be decomposed. A treatment time of the drying treatment is adjusted depending on a water content of the carrier, but it is preferred to perform heating at a temperature within the above-described range for at least 30 minutes or more. The upper limit of the drying time needs not be especially limited, but is preferably 120 minutes or less in consideration of production efficiency.

In the preferable production method of the present invention, the impregnation with a platinum salt solution and the drying are performed a plurality of times until the target supported amount of platinum salt is supported by the above-described divided supporting, and then the burning step is performed. The burning step is a treatment for precipitating platinum by decomposing platinum salt, and changing platinum into platinum oxides working as the activity source of the catalyst. A heating temperature in the burning step is preferably 350° C. or more and 500° C. or less. At less than 350° C., the generation of platinum oxides is insufficient. Over 500° C., platinum oxides thus generated are decomposed into metal platinum. The heating temperature is more preferably 380° C. or more and 480° C. or less. A treatment time of the burning step is preferably 1 hour or more and 5 hours or less. An atmosphere in the burning step is not especially limited as long as it is an oxidizing atmosphere such as air.

The drying treatment (the drying treatment performed after the final impregnation treatment in the divided supporting) and the burning step may be performed in conjunction. In other words, after performing heating at a temperature of 60° C. or more and 150° C. or less for a prescribed time period in the drying treatment, the temperature can be increased again up to the burning temperature for performing heating for the burning treatment. In this case, heating may be performed at the same temperature increase rate straight from the drying temperature to the burning temperature. Alternatively, the temperature increase rate may be adjusted during increase from the drying temperature to the burning temperature. Regarding behavior in change of platinum salt into platinum oxides after the drying treatment, the platinum salt decomposes at from 150° C. to about 300° C., and becomes oxides at about 300° C. or more, and at over 500° C., the oxides decompose. Therefore, from the temperature of the drying treatment to 300° C., a low temperature increase rate (1 to 3° C./min) is employed to cause the decomposition of platinum salt to proceed, and a comparatively high temperature increase rate (5 to 10° C./min) is employed from 300° C. to 500° C. so that platinum oxides can be efficiently and stably generated. It is, however, not essential to perform such stepwise adjustment of the temperature increase rate, and platinum oxides can be formed even when the heating is performed straight from the drying temperature to the burning temperature as described above. The temperature increase rate employed in such a case is preferably approximately 1 to 3° C./min.

Through the burning step described above, platinum oxides are supported on the carrier. As is obvious from the above description, although the impregnation with a platinum salt solution is performed a plurality of times in the present invention, the burning step is performed only once after the final impregnation, and is not performed after every time of the impregnation. If the burning is performed after every time of the impregnation in the divided supporting, platinum salt may be adsorbed/bonded to platinum oxides generated by the burning, and sintering may be caused when the resultant is burnt, to generate coarse oxides.

(2) Iridium Supporting Step

After performing the supporting of platinum on the tin oxide carrier and the burning, supporting of iridium is performed. Also the supporting of iridium is performed through impregnation with an iridium salt solution, but differently from the supporting of platinum, the supporting can be performed by performing the impregnation treatment once, and divided supporting is not always necessary.

Examples of the iridium salt solution for impregnation for supporting iridium include halogenated iridium aqueous solutions such as an iridium nitrate aqueous solution and an iridium chloride aqueous solution, halogenated iridate aqueous solutions such as a hexachloroiridate aqueous solution, and a hexaammineiridium aqueous solution. A method for impregnating the iridium salt solution is not also especially limited, and any one of spraying, dripping, and dipping may be employed.

After the impregnation treatment of the iridium salt solution, a drying treatment is performed as in that for platinum. In the drying treatment for iridium salt, strict conditions as those for platinum in consideration of decomposition of platinum salt are not necessary. However, the drying treatment is preferably performed at a temperature of 60° C. or more and 150° C. or less as in that for platinum. As for a drying time, heating is performed preferably for 30 minutes or more and 2 hours or less.

Then, through the burning step, precipitation of iridium from iridium salt and generation of iridium oxide are performed. According to the present inventors, there is no need to strictly set burning conditions for iridium differently from platinum. This is because oxide is comparatively easily generated from iridium as compared with platinum, and the oxide is unlikely to be decomposed. In the burning of iridium, heating is performed preferably at 350° C. or more. An atmosphere for the burning step for iridium is also not especially limited as long as it is an oxidizing atmosphere such as air. If the burning step for iridium is performed at an excessively high temperature, however, platinum oxides may be decomposed. Therefore, also in the burning step for iridium, the upper limit temperature is preferably 500° C. A drying time is preferably similar to that employed in supporting platinum.

(D-2) Second Region Forming Step (Overcoat Layer Forming Step)

By supporting platinum and iridium on the tin oxide carrier as described above, a pre-catalyst corresponding to a precursor is produced. Then, a treatment for forming the second region is performed on the catalyst surface of the pre-catalyst, and thus, the methane combustion catalyst of the present invention is produced.

A second region forming step is not especially limited as long as a method capable of supplying tin oxide to be adsorbed onto the pre-catalyst is employed. An example includes a treatment for applying a slurry of a tin oxide powder onto the pre-catalyst. Alternatively, tin oxide can be supplied by chemical vapor deposition or a surface treatment method such as sputtering.

In a preferable form of the second region forming step, a slurry of a tin oxide powder is applied. The amount of tin oxide to be supplied can be adjusted by adjusting the concentration of the slurry. In particular, impregnation with the slurry is useful for forming an overcoat layer having a proper thickness. In employing the impregnation with a slurry of a tin oxide powder, the same tin oxide powder as that used for the carrier can be used as the tin oxide powder to be dispersed in the slurry. The slurry of tin oxide can be prepared by mixing the tin oxide powder with water as a dispersion medium, and a binder. The tin oxide slurry can be applied to the catalyst by air blowing, spraying, dipping and the like. After applying the slurry, a drying treatment is performed if necessary.

(D-3) Supporting of Iridium in Overcoat Layer

Through the second region forming step by applying the tin oxide slurry or the like described above, the methane combustion catalyst of the present invention is produced. As described above, however, the methane combustion catalyst of the present invention can also exhibit proper properties by supporting iridium additionally in the overcoat layer containing tin oxide as a principal component. This additional supporting of iridium is performed by impregnation with an iridium salt solution after forming the second region (overcoat layer) as described above.

For the impregnation with an iridium salt solution, an iridium salt solution similar to that used in producing the pre-catalyst described above can be used. The impregnation method with the iridium salt solution is also similar. After the impregnation with the iridium salt solution, a drying treatment and a burning treatment are performed under conditions similar to those described above, and thus, iridium is supported. Differently from such a method of impregnation of the overcoat layer with the iridium salt solution, an overcoat layer containing iridium can be formed through one step by causing an iridium catalyst using tin oxide as a carrier ($IrO_x/SnO_2$) to be supported in the pre-catalyst.

(D) Methane Combustion Method with Methane Combustion Catalyst of the Invention

A methane combustion method applying the methane combustion catalyst of the present invention described above is basically the same as the conventional methods. A target of the methane combustion method of the present invention is a combustion exhaust gas containing methane as well as sulfur oxide. In addition to methane and sulfur oxide, other hydrocarbons such as ethane and propane, carbon monoxide, and combustible components such as oxygen, an oxygen-containing compound, and nitrogen oxide may be contained.

In combustion of methane in the combustion exhaust gas, the gas to be treated is caused to pass through a combustion device provided with the methane combustion catalyst of the present invention to be brought into contact with the methane combustion catalyst. As the combustion device, a known device can be applied, and for example, a fixed bed flow reactor or the like can be applied. An amount of the catalyst used in such a combustion device is generally set in terms of a gas hourly space velocity (GHSV). In the present invention, the space velocity is preferably 80,000 $h^{-1}$ or less for ensuring a methane combustion rate. Catalytic activity is improved by lowering the space velocity, and hence the space velocity is preferably as low as possible. In consideration of the catalytic activity, economic performance and pressure loss, however, the space velocity is preferably 1,000 $h^{-1}$ or more.

A temperature for heating the methane combustion catalyst for purifying a combustion exhaust gas, namely, a reaction temperature, is 340° C. or more and 500° C. or less. The reaction temperature is more preferably 350° C. or more and 475° C. or less.

EXAMPLES

First Embodiment: A preferable embodiment of the present invention will now be described. In the present embodiment, a pre-catalyst (first region, base catalyst layer) was produced by forming a tin oxide carrier on a support (cordierite honeycomb), and causing platinum and iridium to be supported thereon, a tin oxide slurry was applied thereto, and thus, a methane combustion catalyst having an overcoat layer corresponding to a layered second region was produced.

Example 1 ($SnO_2$/Pt-Ir/$SnO_2$)

[Production of Pre-Catalyst]

A commercially available $SnO_2$ sol as a binder was mixed/ground with a commercially available tin oxide powder with a ball mill to produce a tin oxide slurry. The tin oxide slurry was applied by air blowing on a commercially available cordierite honeycomb (manufactured by NGK Insulators, Ltd.: ϕ25.4 mm×50 mmL) to obtain a tin oxide carrier (specific surface area of tin oxide: 12.09 $m^2$/g). At this point, the number of times of performing air blowing was adjusted to adjust the mass of the tin oxide carrier. In this Example 1, 342 g/L of the tin oxide carrier based on the volume of the support was formed.

Platinum was supported on the tin oxide carrier (honeycomb support) by divided supporting. As a platinum salt solution to be impregnated in the divided supporting, a dinitrodiammine platinum-ammonia aqueous solution was used. As the dinitrodiammine platinum-ammonia aqueous solution, a solution obtained by dissolving dinitrodiammine platinum in ammonia water, and adjusting the resultant to pH 12 was used. In the present embodiment, the number of times of the divided supporting was set to 4 times, and a platinum concentration in a platinum salt solution used in every time was adjusted with respect to a target supported amount. Through the impregnation with the platinum salt solution of the respective times, the platinum salt solution was air blown onto the tin oxide carrier. After the impregnation with the platinum salt solution, a drying step was performed. In the drying step, the tin oxide carrier after the impregnation was put in a drier machine kept at 110° C., and held therein for 30 minutes as a drying treatment. The impregnation with the platinum solution and the drying step were performed 4 times. In this Example 1, 30 g/L of platinum based on the volume of the support was supported.

Then, after the impregnation with the platinum salt solution and the drying, the resultant tin oxide carrier was burnt. The temperature was increased from the drying temperature (110° C.) in the final drying step in the supporting step described above at a temperature increase rate of 1° C./min to 275° C., and was kept at this temperature for 3 hours. A heating step described so far was performed in consideration of decomposition of platinum salt. Then, the temperature was increased from 275° C. at a temperature increase rate of 1° C./min to a set burning temperature (450° C.), and was kept at this temperature for 3 hours for a burning treatment. In this manner, a tin oxide carrier supporting platinum oxides was produced.

On the tin oxide carrier (platinum supported), iridium was supported, and the resultant was burnt. Here, as an iridium salt solution, a hexachloroiridate aqueous solution was used, and a target supported amount was adjusted in accordance with an iridium concentration therein. For impregnation with the iridium salt solution, the entire solution was impregnated at one time. After the impregnation of the iridium salt, drying was performed at 110° C. for 0.5 hours, and the temperature was increased from this temperature at a temperature increase rate of 5° C./min to a burning temperature (450° C.) the same as that for platinum, and was kept at this temperature for 3 hours for burning treatment. In this Example, 30 g/L of platinum based on the volume of the support was supported. Through these steps, a pre-catalyst corresponding to a precursor of a methane combustion catalyst of the present embodiment was produced. In this pre-catalyst, the supported amount of platinum was 8% by mass on a mass basis of the entire catalyst, and the supported amount of iridium was 0.8% by mass on a mass basis of the entire catalyst.

[Second Region (Overcoat Layer) Forming Step]

A tin oxide slurry was applied to the pre-catalyst produced as described above. As the tin oxide slurry, the same tin oxide slurry as that used in forming the carrier was used. The tin oxide slurry was applied by air blowing, and the mass of tin oxide was adjusted by adjusting the number of times of performing air blowing. In this Example 1, 150 g/L of tin oxide based on the volume of the support was applied to form an overcoat layer corresponding to a second region in a thickness ranging from 30 to 60 m (28.5% by mass with respect to the total mass of the catalyst).

Through the formation of the overcoat layer, the methane combustion catalyst of the present example was produced. This methane combustion catalyst contained 5.7% by mass of platinum, 0.6% by mass of iridium, and 93.7% by mass of tin oxide (both in the carrier and the overcoat layer) on a mass basis with respect to the total mass of the catalyst including the overcoat layer.

Example 2 (Ir—$SnO_2$/Pt-Ir/$SnO_2$)

In this Example 2, iridium was additionally supported in the overcoat layer (second region) including tin oxide alone of the methane combustion catalyst of Example 1. First, an overcoat layer was formed by applying the same tin oxide slurry as that used in Example 1 on the same pre-catalyst as that of Example 1 by the same method. In this example, 45 g/L of tin oxide based on the volume of the support was applied (11.3% by mass with respect to the total mass of the catalyst).

Then, iridium was supported in the overcoat layer. As an iridium salt solution, a hexachloroiridate aqueous solution was used, and a target supported amount was adjusted in accordance with an iridium concentration therein. For impregnation with the iridium salt solution, the total amount of the solution was impregnated at one time. After the impregnation of the iridium salt, drying was performed at 110° C. for 0.5 hours, and the temperature was increased from this temperature at a temperature increase rate of 5° C./min to a burning temperature (450° C.), and was kept at this temperature for 3 hours for burning treatment. In this example, 3 g/L of iridium based on the volume of the support was supported. Thus, a methane combustion catalyst of Example 2 was produced. This methane combustion catalyst contained 7.1% by mass of platinum, 1.4% by mass of iridium, and 91.5% by mass of tin oxide (both in the carrier and the overcoat layer) on a mass basis of the entire catalyst.

Reference Example 1: (Pt—Ir/$SnO_2$)

In order to ascertain the effect of an overcoat layer, the pre-catalyst (including the first region alone) produced in Example 1 was used as a methane combustion catalyst. The pre-catalyst produced in the present embodiment is a catalyst produced through optimized production processes including a platinum supporting step (divided supporting), a drying step and the like. Therefore, as compared with a conventional methane combustion catalyst, it is a catalyst expected to exhibit high-level effect (methane combustion activity).

Comparative Example 1: (Pt—Ir/$SnO_2$)

As a comparative example for Examples 1 and 2 and Reference Example, in this Comparative Example 1 where a catalyst was produced in accordance with production processes of a conventional methane combustion (Patent Document 1), differently from the production process of the pre-catalyst of Example 1 (Reference Example 1), the entire amount of a platinum salt solution containing a target supported amount of platinum was impregnated in a tin oxide carrier through one operation without employing the divided supporting. After the impregnation with the platinum salt solution, drying and burning were performed. In the drying treatment, heating was performed at a temperature of 110° C. for 1 hour, and in the burning treatment, heating was performed at 550° C. for 3 hours. A temperature increase rate in each treatment was the same as that employed in Example 1. Thereafter, the iridium supporting step and the burning step were performed in the same manner as in Example 1. The supported amounts of platinum and iridium were the same as those of Example 1.

[Electron Microanalyzer Analysis (EPMA)]

A catalyst cross section of each of the methane combustion catalysts produced as described above was analyzed by EPMA to perform elemental analysis in the first region (base catalyst layer) and the second region (overcoat layer). In the EPMA, JXA-8500F manufactured by JEOL Ltd. was used as an analyzer, and measurement conditions were an acceleration voltage of 20 kV, and an illumination current of $2.2\times10^{-8}$ A.

In the EPMA analysis of the catalyst cross section, line analysis was performed with an electron beam irradiation position moved by 2 μm each from a portion close to the center of the honeycomb support toward a surface layer of the catalyst layer. At each point, intensities of characteristic X-ray of Pt, Sn and Ir were analyzed. It is noted that an electron beam irradiation interval can be appropriately set in consideration of the amount of tin oxide applied in forming the first region and the second region.

The first region (base catalyst layer) and the second region (overcoat layer) were determined based on results of the EPMA analysis as follows. First, a peak position of the first peak of the X-ray intensity of Pt was set as a start point of the first region (base catalyst layer). Then, a peak position obtained immediately before when the measured X-ray intensity of Pt was reduced by 80% or more as compared with X-ray intensity before a precedently set first end point determination distance ($Z_1$ (μm)) was determined as an end point of the first region. In addition, a position where the X-ray intensity of Pt was reduced to substantially zero was set as a start point of the second region (overcoat layer). Thereafter, the X-ray intensity of Sn was continuously measured, and hence, a position that was away by a second end determination distance ($Z_2$ (μm)), from a position where the X-ray intensity of Sn was reduced by 80% or more was determined as an end point of the second region. In the present embodiment, the first and second end determination distances ($Z_1$ and $Z_2$) for end point determination of each region were both set to 20 μm. The $Z_1$ and $Z_2$ can be set in consideration of the electron beam irradiation interval of the EPMA analysis (2 μm in the present embodiment) and the like. The $Z_1$ and $Z_2$ are preferably set to about 5 times or more and 10 times or less as large as the electron beam irradiation interval of the EPMA analysis.

In determining the X-ray intensity (counts) of platinum for determining the start point of the second region, the background was considered. As is known from FIG. 1 and the like described later, the count number of platinum in the second region is about 3000 or less, or 2000 or less. In consideration of this count number of platinum together with background count number, a position where the X-ray intensity of platinum was substantially zero was defined as the second region.

Figure 2:
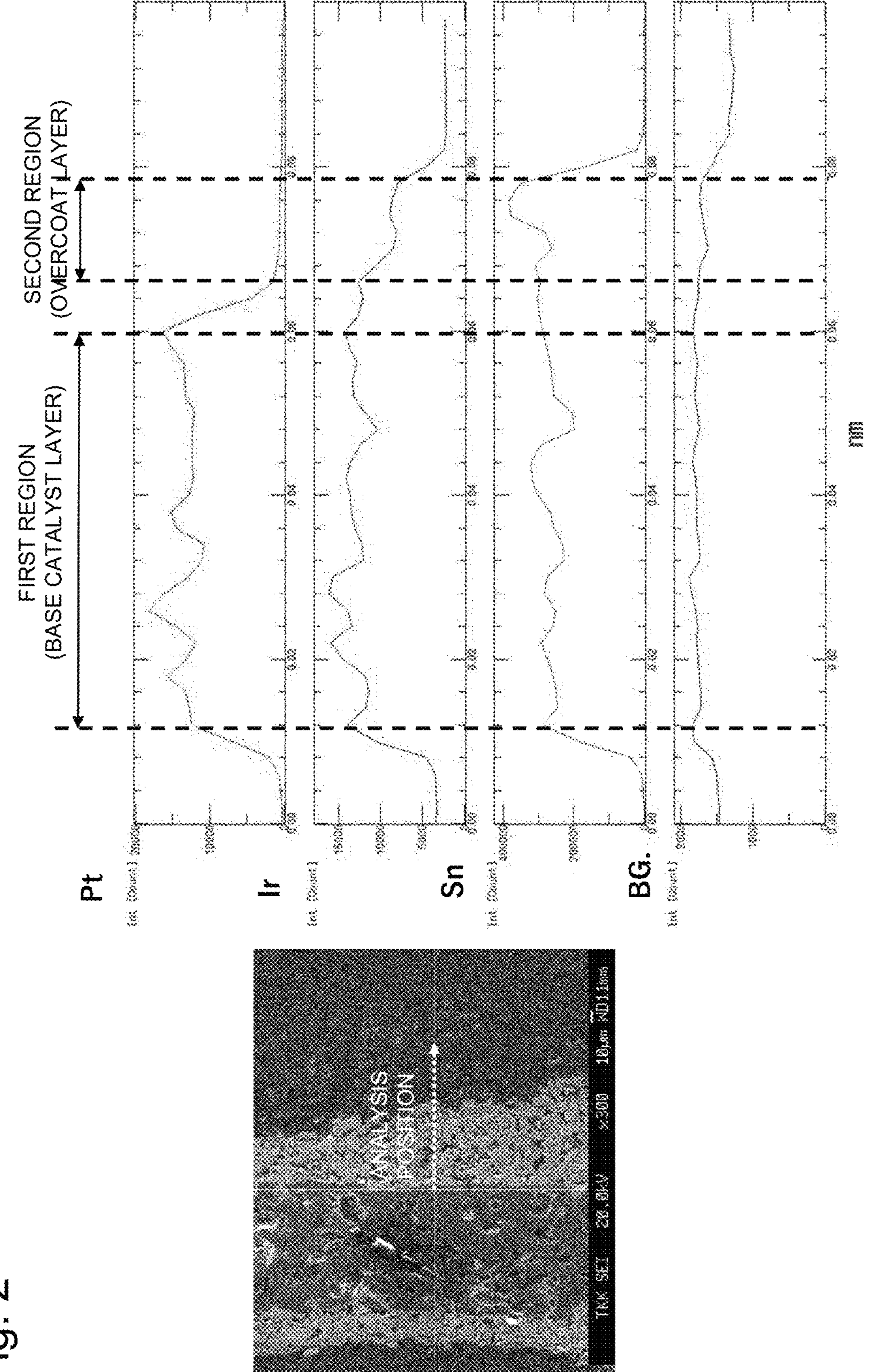
FIG. 2 is a diagram illustrating results of EPMA line analysis performed on a methane combustion catalyst cross-section of Example 2 of First Embodiment.
Figure 3:
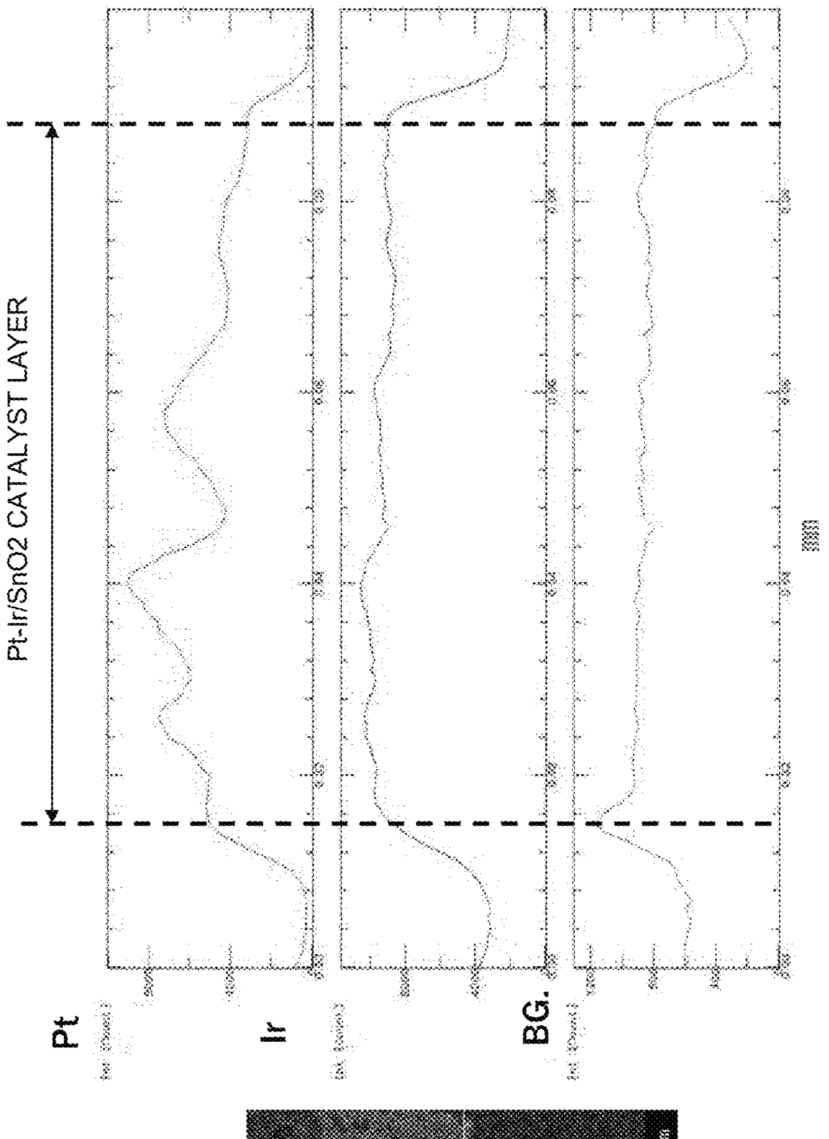
FIG. 3 is a diagram illustrating results of EPMA line analysis performed on a methane combustion catalyst cross-section of Reference Example 1 of First Embodiment.

Exemplified results of the line analysis by EPMA performed in the present embodiment of Example 1, Example 2 and Reference Example 1 are respectively shown in FIG. 1 to FIG. 3. In each profile of the line analysis thus obtained, the X-ray intensity of Sn in each of the first region and the second region was averaged, and the X-ray intensity of Sn in the first region thus obtained was defined as $X_1$, and the X-ray intensity of Sn in the second region thus obtained was defined as $X_2$. Then, an X-ray intensity ratio of Sn, $X_2/X_1$, of each region was calculated. In the present embodiment, the line analysis was performed on arbitrary 5 portions in each sample to obtain an average of $X_2/X_1$.

In the methane combustion catalyst in which iridium was additionally added to the overcoat layer of Example 2, it was confirmed, based on the analysis result of EPMA, that 1.1% of iridium was contained based on the mass of the overcoat layer.

Evaluation Test of Methane Combustion Activity (Initial Activity and Long-Term Durability)

Figure 4:
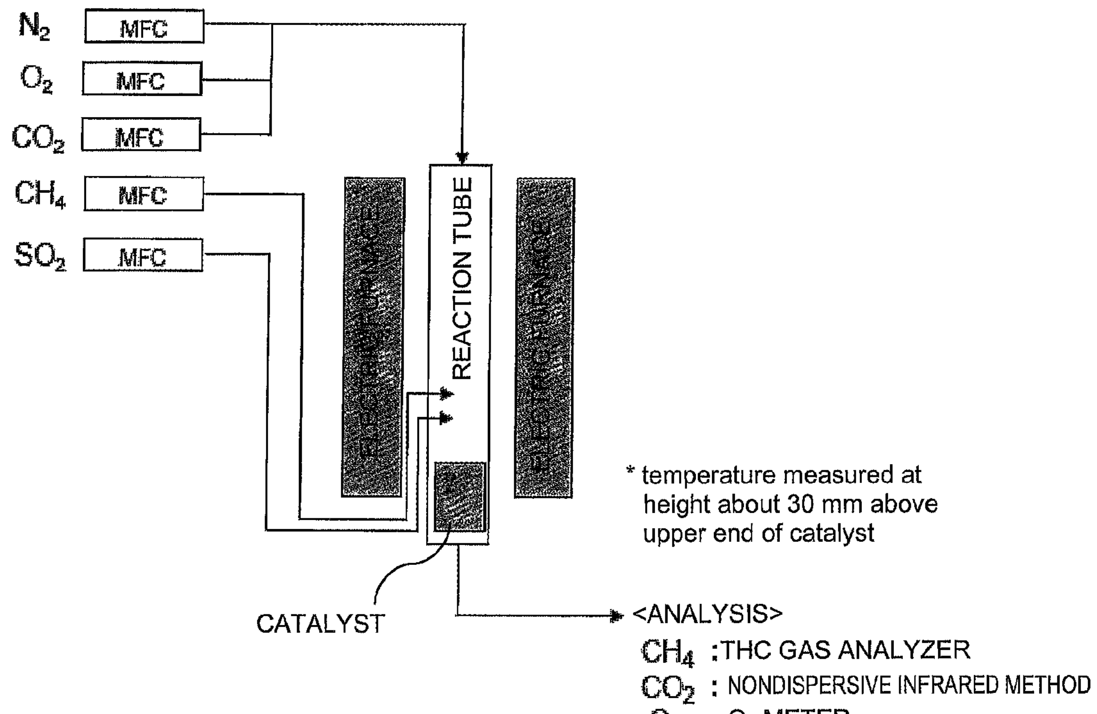
FIG. 4 is a diagram schematically illustrating the structure of a test device for a methane combustion test performed in the present embodiment.

Next, each of the thus produced methane combustion catalysts was used for performing a test for performance evaluation. In this evaluation test, each catalyst was set in a test device of FIG. 4 simulating a fixed bed reactor, and a test gas was allowed to pass therethrough to measure a methane conversion. Test conditions were as follows:

Reaction temperature (catalyst temperature): 400° C.

Test gas composition:

- $CH_4$: 2000 ppm
- $CO_2$: 5%
- $O_2$: 10%
- $H_2O$: 10%
- $SO_2$: 1 ppm
- $N_2$: balance Space velocity (GHSV): 80,000 $h^{-1}$ Test time: 24 hours The test gas was passed through the catalyst under the above-described conditions, and the composition of an exhaust gas was analyzed every hour to measure a methane conversion. Then, a maximum activity value obtained up to 4 to 6 hours after starting the test was defined as initial activity. For the measurement of the methane conversion, the exhaust gas was analyzed with an FID THC analyzer, a nondispersive infrared analyzer, and a magnetic oxygen analyzer to obtain $CH_4$, $CO_2$ and $O_2$ concentrations. Then, the methane conversion was calculated from the measured values in accordance with the following expression:

[Expression 2]

$$CH_4\ \text{conversion}(\%) = \frac{\left(\begin{array}{c}(CH_4\ \text{concentration before reaction}) - \\ (CH_4\ \text{concentration after reaction})\end{array}\right)}{(CH_4\ \text{concentration before reaction})} \times 100$$

The methane combustion test was continued after measuring the initial activity, the methane conversion was measured every hour until 24 hours had elapsed, and a time-methane conversion curve was plotted based on the results. In the present embodiment, the thus obtained time-methane conversion curve (deterioration curve) was linearly approximated to obtain the slope of the line, and long-term durability was evaluated based on the magnitude of the absolute value. Regarding this durability evaluation method, the methane combustion test performed in the present embodiment is an accelerated test at a $SO_2$ concentration in an exhaust gas of 1 ppm, that is, a rather high concentration as compared with that in the actual usage environment. Since this is an accelerated test, the rate of activity decrease of a catalyst is high, but durability performance can be thus grasped in a short period of time. Here, a difference in durability can be determined particularly depending on the slope of the time-methane conversion curve, and therefore, the durability was evaluated by the above-described method.

Regarding the respective methane combustion of Examples, Reference Example, and Comparative Example produced in the present embodiment, Table 1 shows the results of the EPMA analysis (the X-ray intensity ratios, $X_2/X_1$, of Sn in the first and second regions) and the methane combustion activity evaluation test (evaluation results of the initial activity and the durability).

TABLE 1

| | Catalyst Structure | | | | | | Catalyst Activity Evaluation | |
|---|---|---|---|---|---|---|---|---|
| | First Region (Base Catalyst Layer) | Second Region (Overcoat Layer) | Composition of Entire Catalyst Pt [wt %] | Ir [wt %] | $SnO_2$ [wt %] | EPMA Line Analysis $X_2/X_1$* | Initial Activity | Durability (Slope of Deterioration Curve) |
| Example 1 | Pt-Ir/$SnO_2$ | $SnO_2$ | 5.7 | 0.6 | 93.7 | 1.086 | 95.3 | −0.057 |
| Example 2 | | $SnO_2$ + Ir | 7.1 | 1.4 | 91.5 | 1.218 | 98.0 | −0.051 |
| Reference Example 1 | Pt-Ir/$SnO_2$ | — | 8.0 | 0.8 | 91.2 | — | 95.4 | −0.079 |
| Comparative Example 1 | | — | 8.0 | 0.8 | 91.2 | — | 49.6 | −0.163 |

*average of $X_2/X_1$ of line analysis results obtained in 5 portions in each sample Referring to Table 1, there was no large difference in initial activity between Examples 1 and 2 and Reference Example, and all of these methane combustion catalysts exhibited a high methane conversion of 95% or more. As for the durability, the slopes of the deterioration curves of Examples 1 and 2 were both smaller than that of Reference Example. In other words, it was revealed that durability was excellent. The methane combustion catalyst of Comparative Example was lower in the initial activity and inferior in durability as compared with those of Examples 1 and 2. Reference Example 1 was a catalyst improved in the platinum supporting step and the like of the conventional technique (Patent Document 1), and the methane combustion catalysts of Examples 1 and 2 could exhibit initial activity and durability superior to those of Reference Example. This is probably because of the effect of tin oxide used in the second region (overcoat layer). Example 2 that was obtained by further adding iridium to the second region was more favorable in both initial activity and durability as compared with Example 1 obtained without the further addition.

Second Embodiment: In the present embodiment, methane combustion catalysts having varying amounts of tin oxide and iridium to be supplied for forming the second region were produced, and performances thereof were evaluated. In addition, a methane combustion catalyst having a varied constitution of a pre-catalyst (base catalyst layer) was also produced to be evaluated. As these catalysts, a plurality of methane combustion catalysts were produced through the same processes as those of Example 1 of First Embodiment by adjusting the supported amounts of the precious metals while changing the platinum concentration in the platinum salt solution and the iridium concentration in the iridium salt solution. In addition, some of the catalysts having an overcoat layer formed therein were subjected to EPMA analysis and XPS analysis.

The methane combustion catalysts of respective examples produced in the present embodiment were subjected to the EPMA line analysis in the same manner as in First Embodiment to obtain the X-ray intensity ratios, $X_2/X_1$, of Sn in the first and second regions, and an iridium content in the second region. The methane combustion catalyst activities were also evaluated for initial activity and durability (slope of a deterioration curve) under the same conditions as those employed in First Embodiment. Results thus obtained are shown in Table 2.

TABLE 2

| | Catalyst Structure | | | | | | | | Catalyst Activity Evaluation | |
|---|---|---|---|---|---|---|---|---|---|---|
| | First Region (Base Catalyst Layer) | Second Region (Overcoat Layer) | Composition of Entire Catalyst | | | Ratio of Overcoat Layer | Ir Amount in OC | EPMA Line Analysis $X_2/X_1$* | Initial Activity | Durability (Slope of Deterioration Curve) |
| | | | Pt [wt %] | Ir [wt %] | $SnO_2$ [wt %] | | | | | |
| Example 1 | Pt-Ir/$SnO_2$ | SnO2 | 5.7 | 0.6 | 93.7 | 28.6 | — | 1.086 | 95.3 | −0.0574 |
| Example 2 | | $SnO_2$ + Ir | 7.1 | 1.4 | 91.5 | 11.3 | 1.099 | 1.218 | 98.0 | −0.0507 |
| Example 3 | | | 5.5 | 1.1 | 93.4 | 31.6 | 0.990 | 1.097 | 94.6 | −0.0235 |
| Example 4 | | | 5.3 | 1.1 | 93.7 | 34.0 | 0.760 | 1.139 | 93.7 | −0.0065 |
| Example 5 | | | 4.8 | 1.0 | 94.3 | 40.3 | 0.715 | 1.221 | 92.1 | −0.0629 |
| Example 6 | | | 10.3 | 2.1 | 87.7 | 30.1 | 0.780 | 1.152 | 95.0 | −0.0270 |
| Example 7 | | | 8.0 | 1.6 | 90.5 | 30.8 | 0.940 | 1.264 | 95.3 | −0.0175 |
| Reference Example 1 | Pt-Ir/$SnO_2$ | — | 8.0 | 0.8 | 91.2 | — | — | — | 95.4 | −0.0785 |
| Comparative Example 1 | | — | 8.0 | 0.8 | 91.2 | — | — | — | 49.6 | −0.1628 |

*average of $X_2/X_1$ of line analysis results obtained in 5 portions in each sample Referring to Table 2, it was confirmed that the methane combustion catalysts of the respective examples all exhibited a methane conversion of 90% or more as the initial activity, and were superior also in the durability to those of Reference Example and Comparative Example.

Figure 5:
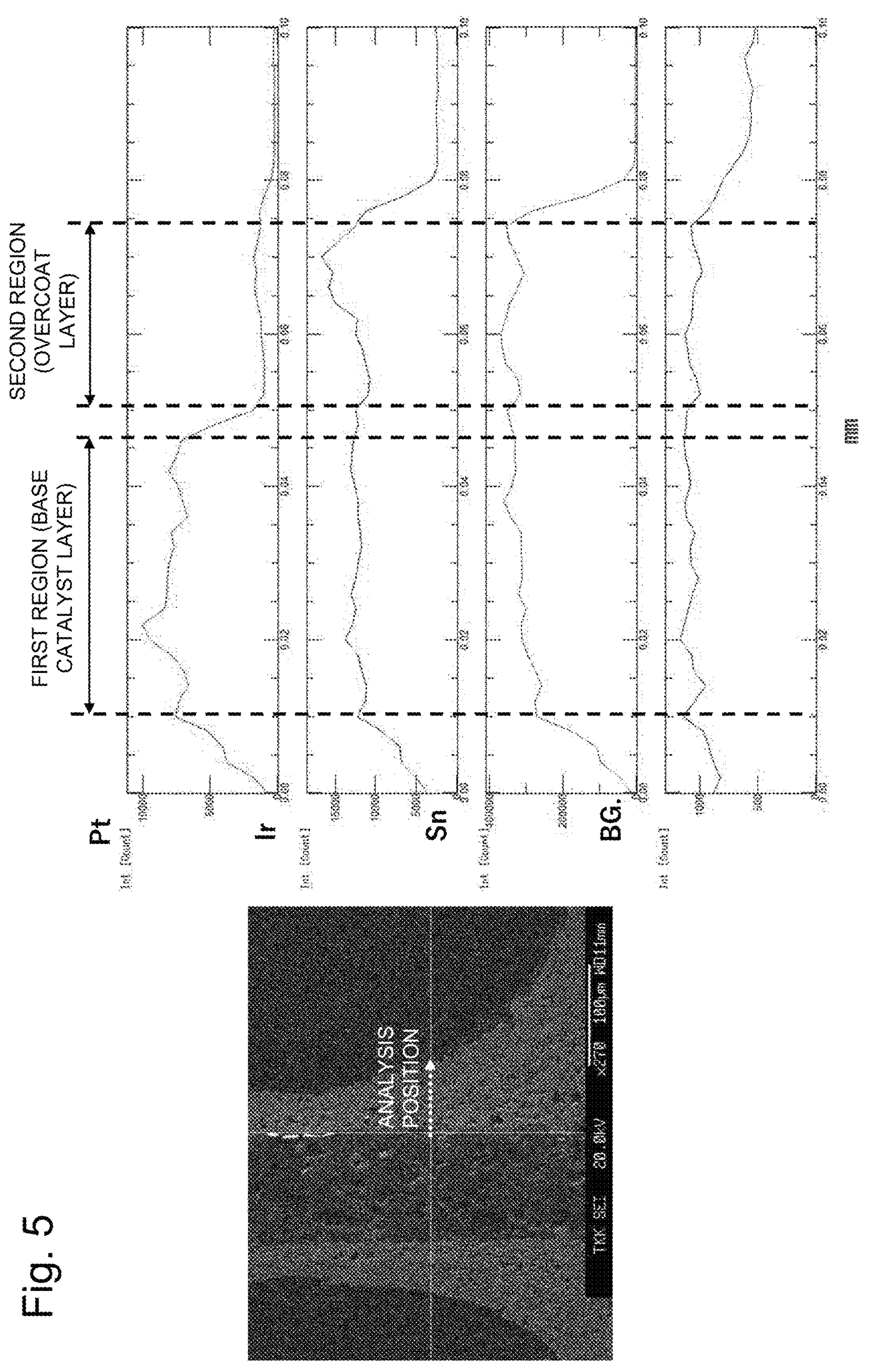
FIG. 5 is a diagram illustrating results of EPMA line analysis performed on a cross-section of a methane combustion catalyst of Example 3 of Second Embodiment.
Figure 6:
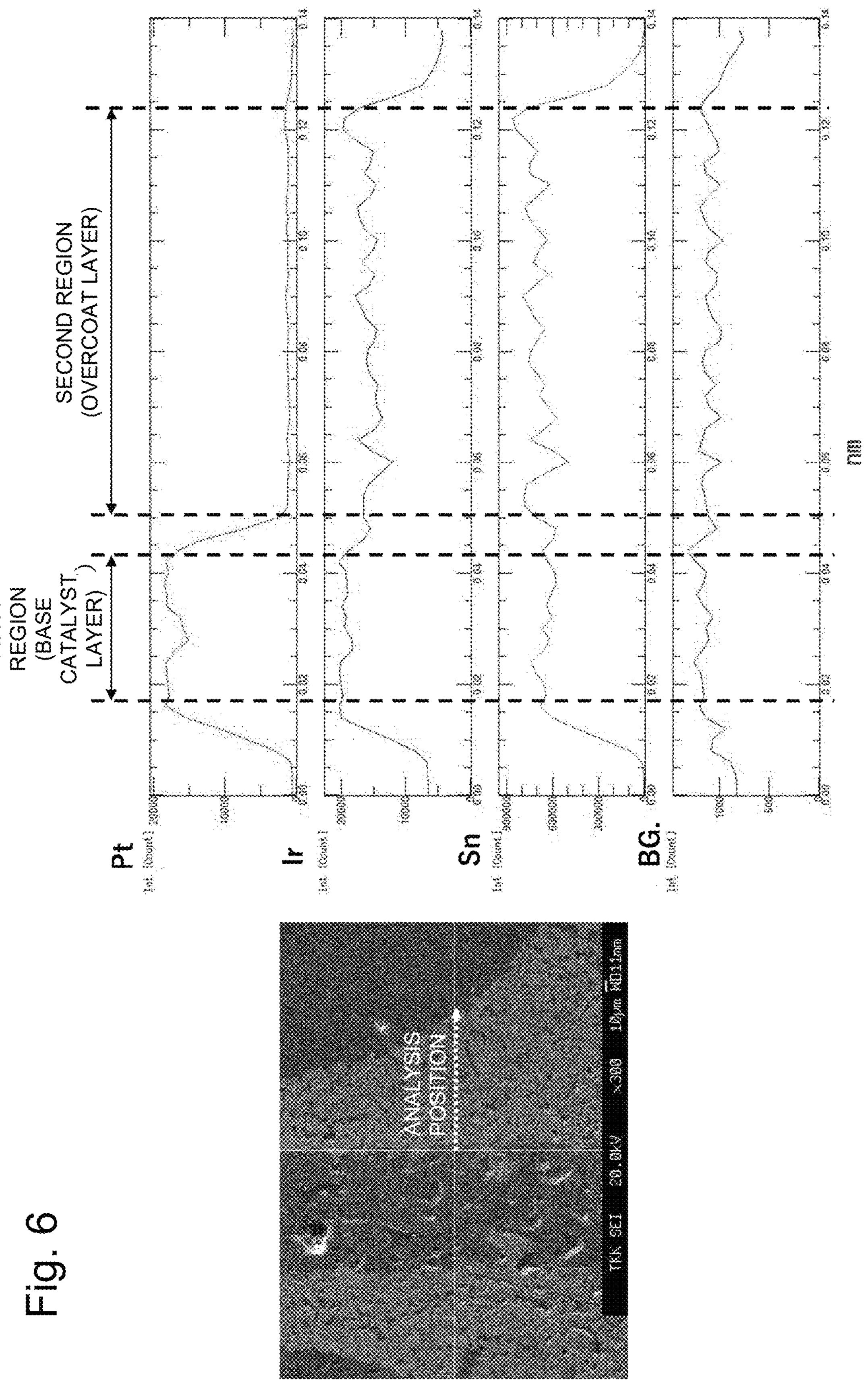
FIG. 6 is a diagram illustrating results of EPMA line analysis performed on a cross-section of a methane combustion catalyst of Example 5 of Second Embodiment.
Figure 7:
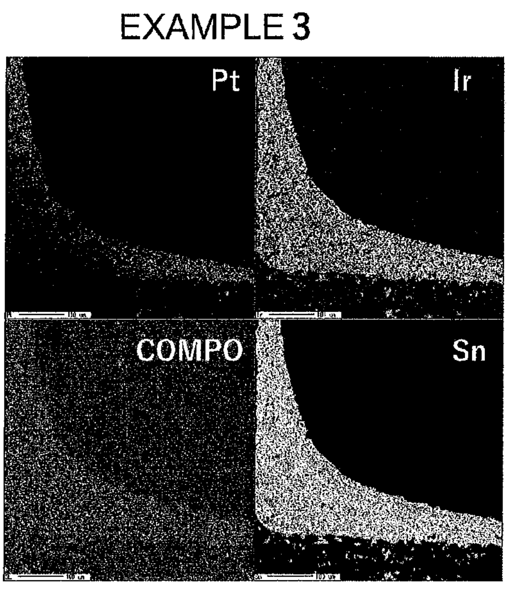
FIG. 7 is a diagram illustrating EPMA mapping profiles of cross-sections of the methane combustion catalysts of Examples 3 and Example 5 of Second Embodiment.
Figure 7:
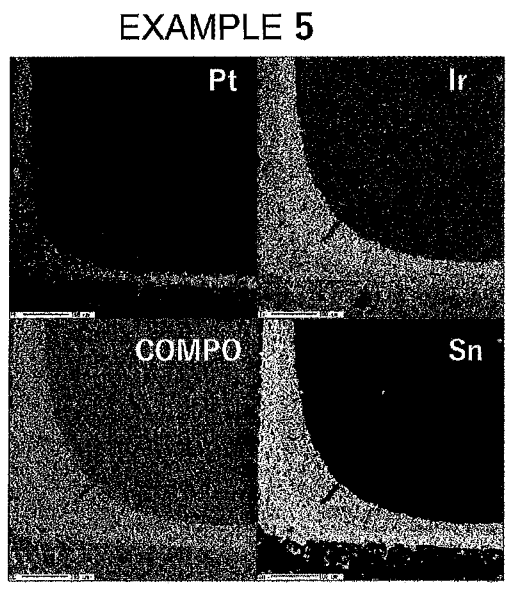

FIGS. 5 and 6 illustrate results of the EPMA line analysis of the methane combustion catalysts of Examples 3 and 5. FIG. 7 illustrates EPMA mapping profiles (distributions of Pt, Ir and Sn) of the methane combustion catalysts of Examples 3 and 5. Referring to FIGS. 5 and 6, it was confirmed that the overcoat layer (second region) was present in the methane combustion catalysts of Examples 3 and 5. It is understood from Sn mapping of FIG. 7 that an overcoat layer having a thickness corresponding to the amount of tin oxide added for the overcoat layer was formed. The overcoat layers of the methane combustion catalysts of these examples did not contain platinum, but contained tin oxide and iridium.

Measurement of Ratio of Platinum Oxides by XPS

Each of the methane combustion catalysts of Examples 3 and 5, Reference Example, and Comparative Example 1 was subjected to XPS analysis to obtain a ratio ($R_{TO}$) of platinum oxides. In the XPS analysis, each catalyst was crushed with an agate mortar to prepare samples, and the XPS analysis was performed under the following conditions. In the XPS analysis, survey scan and narrow scan were performed to obtain a Pt4f spectrum and an Ir4f spectrum.

Analyzer: K-Alpha+ manufactured by Thermo Fisher Scientific

Irradiation X-ray: Al Kα ray for single crystal spectroscopy

X-ray spot system: 400 μm

Neutralizing electron gun: used

Figure 8:
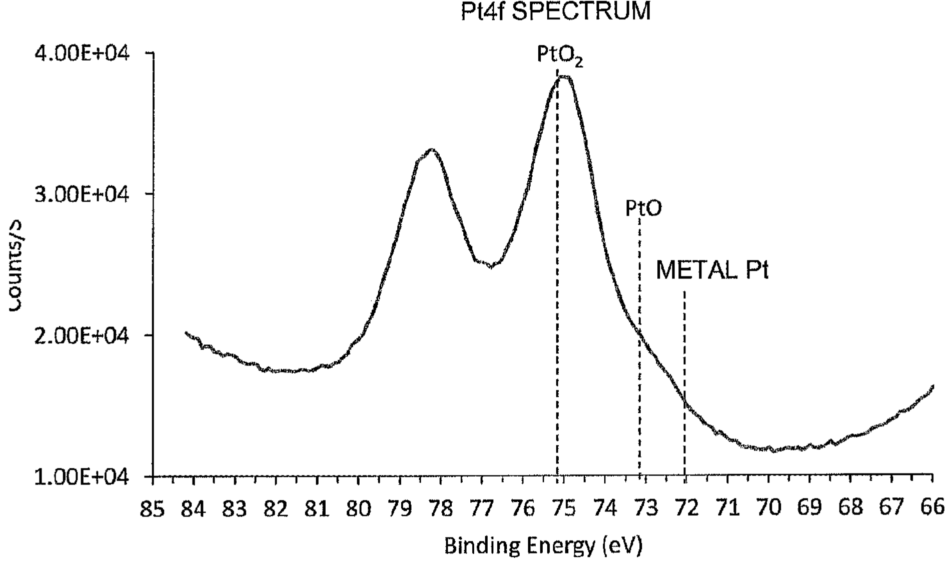
FIG. 8 is a diagram illustrating a Pt4f spectrum and an Ir4f spectrum measured by XPS analysis of the methane combustion catalyst of Example 3.
Figure 8:
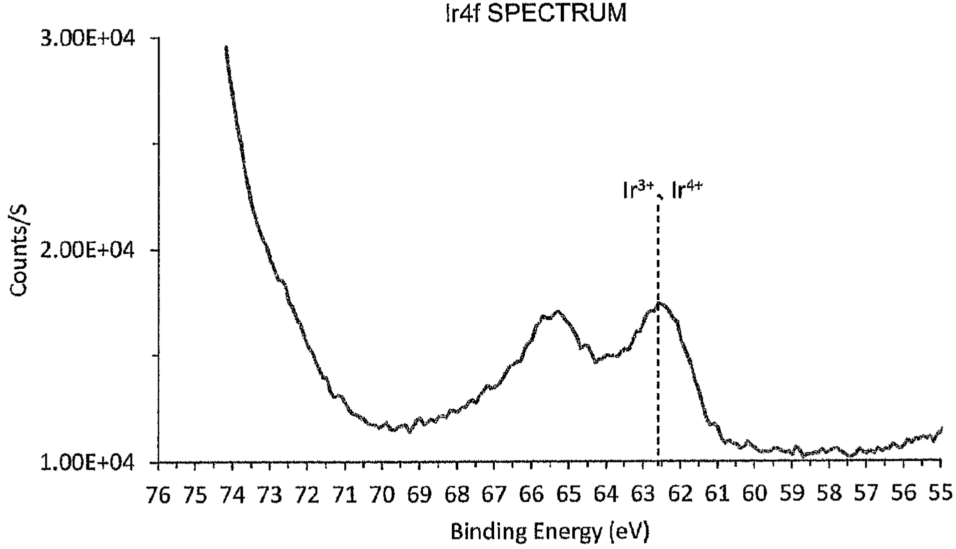

Normalization of binding energy: normalized assuming that C—C and C—H have 2884.6 eV FIG. 8 illustrates a Pt4f spectrum and an Ir4f spectrum measured in the methane combustion catalyst of Example 3 by narrow scan. In the XPS spectrum of platinum, a peak top was obtained in a range of binding energy of 71 to 75 eV. In this range, as platinum oxides, a peak of PtO appeared in a range of 72.8 to 73.2 eV, and a peak of $PtO_2$ appeared in a range of 74.6 to 75 eV. It is understood from FIG. 8 that the peak of Pt oxide ($PtO_2$) strongly appeared and the peak of metal Pt was very weak in the methane combustion catalyst of Example 3. Referring to the spectrum of iridium, iridium was in the form of $Ir^{3+}$ or $Ir^{4+}$, and a peak of metal iridium was not found. Based on this, it is understood that substantially all iridium was present in the form of iridium oxide.

For calculating the existence percentage of platinum oxides, the XPS profile thus obtained was subjected to waveform separation processing to measure a peak area representing each of the states of $PtO_2$, PtO, metal Pt, and iridium (oxide). Also, peak areas of respective elements of oxygen (O), tin (Sn) and carbon (C) were simultaneously measured. Then, the peak areas of the respective components of Pt, Ir, O, Sn and C were corrected with respective relative sensitivity factors (RSF), and with a total peak area of the respective components used as a reference (100), the existence percentages of $PtO_2$, PtO and metal Pt were calculated. Furthermore, based on the existence percentages of $PtO_2$, PtO and metal Pt thus calculated, a ratio ($R_{TO}$) of platinum oxides to metal platinum was calculated. It is noted that analysis software (Advantage-Thermo) was used in the above analysis. Analysis results thus obtained are shown in Table 3.

TABLE 3

| | Pt [wt %] | Ir [wt %] | $SnO_2$ [wt %] | Burning Temperature [° C.] | Estimated Assignment | Existence Percentage | Pt Oxide Ratio ($R_{TO}$) | Methane Conversion [%] | Durability (Slope of Deterioration Curve) |
|---|---|---|---|---|---|---|---|---|---|
| Example 3 | 5.5 | 1.1 | 93.4 | 450 | Metal Pt | 0.1 | 25.00 | 94.9 | −0.0235 |
| | | | | | PtO | 0.5 | | | |
| | | | | | $PtO_2$ | 2 | | | |
| | | | | | $Ir^{3+}$, $Ir^{4+}$ | 0.7 | — | | |

TABLE 3-continued

| | Pt [wt %] | Ir [wt %] | $SnO_2$ [wt %] | Burning Temperature [° C.] | Estimated Assignment | Existence Percentage | Pt Oxide Ratio ($R_{TO}$) | Methane Conversion [%] | Durability (Slope of Deterioration Curve) |
|---|---|---|---|---|---|---|---|---|---|
| Example 5 | 4.8 | 1.0 | 94.3 | 450 | Metal Pt | 0.1 | 15.00 | 92.1 | −0.0629 |
| | | | | | PtO | 0.3 | | | |
| | | | | | $PtO_2$ | 1.2 | | | |
| | | | | | $Ir^{3+}$, $Ir^{4+}$ | 0.5 | — | | |
| Reference Example 1 | 8.0 | 0.8 | 91.2 | 450 | Metal Pt | 0.5 | 8.60 | 95.4 | −0.0785 |
| | | | | | PtO | 1.2 | | | |
| | | | | | $PtO_2$ | 3.1 | | | |
| | | | | | $Ir^{3+}$, $Ir^{4+}$ | 0.5 | — | | |
| Comparative Example 1 | | | | 550 | Metal Pt | 0.5 | 7.40 | 57.9 | −0.1628 |
| | | | | | PtO | 0.6 | | | |
| | | | | | $PtO_2$ | 3.1 | | | |
| | | | | | $Ir^{3+}$, $Ir^{4+}$ | 0.5 | — | | |

In the methane combustion catalysts of Examples 3 and 5, the ratio ($R_{TO}$) of platinum oxides measured by XPS was 10 or more, and it is thus understood that platinum oxides were generated at a very high ratio as compared with that in Comparative Example 1. On the other hand, although platinum oxides were generated also in the conventional methane combustion catalyst of Comparative Example 1, the ratio was low. Catalyst activity is regarded to be in proportion to the supported amount of platinum, but the activity was higher in Example 3 than in Comparative Example 1 although the supported amount of platinum was smaller. It is presumed that the activity was increased by the increase of the ratio of platinum oxides.

In the methane combustion catalyst of Reference Example 1, the ratio ($R_{TO}$) of platinum oxides was higher than in Comparative Example 1, and hence it is deemed that platinum was effectively changed into oxides by optimizing the production method. The ratio ($R_{TO}$) of platinum oxides was, however, lower than those in Examples 3 and 5. It is presumed that the oxidized state of platinum was made more proper by setting a region containing tin oxide as a principal component as the second region in Examples 3 and 5. This probably relates also to improvement of the durability.

INDUSTRIAL APPLICABILITY

A $Pt/SnO_2$-based methane combustion catalyst of the present invention is excellent in methane combustion activity as compared with that of conventional techniques. According to the present invention, owing to improvement of initial activity, a combustion exhaust gas can be treated for a long period of time with catalyst poisoning with sulfur oxide suppressed. The methane combustion catalyst of the present invention can be suitably applied to purification of various exhaust gases generated from engines, boilers, and power generation systems using hydrocarbon fuels such as natural gas and city gas. In addition, the present invention is useful for a power generation system such as a cogeneration system and a gas heat pump (GHP).

What is claimed is:

1. A methane combustion catalyst comprising platinum and iridium supported on a tin oxide carrier for combusting methane in a combustion exhaust gas containing sulfur oxide, wherein, in line analysis by electron probe microanalysis (EPMA) performed on an arbitrary cross-section of the methane combustion catalyst from a deepest catalyst portion toward a catalyst surface, a first region where all of platinum, iridium and tin are detected and a second region where tin is essentially detected but platinum is not detected are both observable, and an X-ray intensity of tin in the first region is $X_1$ and that an X-ray intensity of tin in the second region is $X_2$, a ratio $X_2/X_1$ is 1.08 or more and 1.25 or less.

2. The methane combustion catalyst according to claim 1, wherein a supported amount of platinum on a mass basis with respect to a total mass of the catalyst is 0.5% by mass or more and 15% by mass or less.

3. The methane combustion catalyst according to claim 1, wherein a supported amount of iridium on a mass basis with respect to a total mass of the catalyst is 0.1% by mass or more and 5.0% by mass or less.

4. The methane combustion catalyst according to claim 1, comprising:

a base catalyst layer as the first region comprising a Pt—$Ir/SnO_2$-based catalyst, in which platinum and iridium supported on the tin oxide carrier, and an overcoat layer as the second region comprising tin oxide formed on the base catalyst layer and containing no platinum.

5. The methane combustion catalyst according to claim 4, wherein a supported amount of platinum on a mass basis with respect to a total mass of the catalyst is 0.5% by mass or more and 15% by mass or less.

6. The methane combustion catalyst according to claim 4, wherein a supported amount of iridium on a mass basis with respect to a total mass of the catalyst is 0.1% by mass or more and 5.0% by mass or less.

7. The methane combustion catalyst according to claim 4, wherein the overcoat layer having a mass of 10.0% by mass or more and 45.0% by mass or less with respect to a total mass of the catalyst covers the base catalyst layer.

8. The methane combustion catalyst according to claim 4, wherein the overcoat layer contains iridium.

9. The methane combustion catalyst according to claim 8, wherein an iridium content in the overcoat layer is 0.05% by mass or more and 6.5% by mass or less based on a mass of the overcoat layer.

10. The methane combustion catalyst according to claim 1, wherein a ratio $R_{TO}$ of platinum oxides to metal platinum is 10.0 or more, the ratio $R_{TO}$ being based on state percentages of metal platinum (Pt) and platinum oxides (PtO and $PtO_2$) obtained from a platinum 4f spectrum through measurement of the methane combustion catalyst by X-ray photoelectron spectroscopy (XPS) and calculated in accordance with the following expression:

$$R_{TO} = (R_{PtO} + R_{PtO2}) / R_{Pt} \quad \text{[Expression 1]}$$

wherein $R_{Pt}$ is a state percentage of metal platinum (Pt), $R_{PtO}$ is a state percentage of PtO, and $R_{PtO2}$ is a state percentage of $PtO_2$.

11. The methane combustion catalyst according to claim 1, wherein the methane combustion catalyst is in a shape of any one of grain, granule, pellet, and tablet.

12. The methane combustion catalyst according to claim 1, wherein the methane combustion catalyst is supported on a support in a shape of any one of a plate, a cylinder, a sphere, and a honeycomb.

13. A method for combusting methane for oxidatively removing methane from a combustion exhaust gas containing sulfur oxide, comprising:

setting a reaction temperature to 340° C. or more and 500° C. or less; and bringing the combustion exhaust gas into contact with the methane combustion catalyst defined in claim 1.

14. The methane combustion catalyst according to claim 2, wherein a supported amount of iridium on a mass basis with respect to a total mass of the catalyst is 0.1% by mass or more and 5.0% by mass or less.

15. The methane combustion catalyst according to claim 5, wherein a supported amount of iridium on a mass basis with respect to a total mass of the catalyst is 0.1% by mass or more and 5.0% by mass or less.

16. The methane combustion catalyst according to claim 5, wherein the overcoat layer having a mass of 10.0% by mass or more and 45.0% by mass or less with respect to a total mass of the catalyst covers the base catalyst layer.

17. The methane combustion catalyst according to claim 6, wherein the overcoat layer having a mass of 10.0% by mass or more and 45.0% by mass or less with respect to a total mass of the catalyst covers the base catalyst layer.

* * * * *